(12) United States Patent
Ackerman et al.

(10) Patent No.: US 8,914,408 B2
(45) Date of Patent: Dec. 16, 2014

(54) DETECTING MOBILE OPERATOR NETWORKS

(75) Inventors: Nathan Ackerman, Seattle, WA (US); Shane M. DeSeranno, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 13/021,199

(22) Filed: Feb. 4, 2011

(65) Prior Publication Data

US 2012/0203795 A1   Aug. 9, 2012

(51) Int. Cl.
*G06F 17/30* (2006.01)
*G06Q 10/00* (2012.01)
*G06Q 30/02* (2012.01)

(52) U.S. Cl.
CPC .............. *G06Q 10/00* (2013.01); *G06Q 30/02* (2013.01); *G06F 17/30528* (2013.01)
USPC .......................................... 707/770; 707/803

(58) Field of Classification Search
USPC ........... 455/418, 433; 705/26, 14, 1; 707/803, 707/100, 770
See application file for complete search history.

(56) References Cited

U.S. PATENT DOCUMENTS

| | | | |
|---|---|---|---|
| 5,537,415 A | | 7/1996 | Miller et al. |
| 5,870,717 A * | | 2/1999 | Wiecha .................... 705/26.81 |
| 6,564,377 B1 * | | 5/2003 | Jayasimha et al. ............ 717/174 |
| 6,574,617 B1 * | | 6/2003 | Immerman et al. ................... 1/1 |
| 6,845,383 B1 * | | 1/2005 | Kraenzel et al. ...................... 1/1 |
| 7,013,290 B2 * | | 3/2006 | Ananian .................... 705/26.42 |
| 7,284,007 B1 * | | 10/2007 | Francicus de Heer et al. ....... 1/1 |
| 7,848,751 B2 * | | 12/2010 | Clark et al. ................. 455/435.1 |
| 8,055,747 B2 * | | 11/2011 | Mazur et al. .................... 709/223 |
| 8,145,212 B2 * | | 3/2012 | Lopresti et al. ............... 455/433 |
| 2002/0082953 A1 * | | 6/2002 | Batham et al. .................. 705/27 |
| 2002/0188722 A1 * | | 12/2002 | Banerjee et al. .............. 709/225 |
| 2004/0015408 A1 * | | 1/2004 | Rauen et al. ..................... 705/26 |
| 2004/0192306 A1 | | 9/2004 | Elkarat et al. |
| 2004/0259573 A1 * | | 12/2004 | Cheng ........................ 455/456.3 |
| 2005/0037755 A1 | | 2/2005 | Hind et al. |
| 2005/0107082 A1 | | 5/2005 | Gunaratnam et al. |
| 2005/0148333 A1 | | 7/2005 | Buckley |
| 2005/0176420 A1 | | 8/2005 | Graves et al. |
| 2006/0160537 A1 | | 7/2006 | Buckley et al. |
| 2007/0005450 A1 * | | 1/2007 | Krishnamoorthy et al. .... 705/27 |
| 2007/0015538 A1 * | | 1/2007 | Wang ............................ 455/558 |
| 2007/0190974 A1 | | 8/2007 | Zhang |

(Continued)

OTHER PUBLICATIONS

Mao, Zhihong et al., "Mobile Device Network Selection", U.S. Appl. No. 12/357,401, filed Jan. 22, 2009, pp. 27.

*Primary Examiner* — James Trujillo
*Assistant Examiner* — Thong Vu
(74) *Attorney, Agent, or Firm* — Bryan Webster; Peter Taylor; Micky Minhas

(57) ABSTRACT

Various embodiments are disclosed that relate to detecting mobile operator networks. For example, one disclosed embodiment provides a method of operating a catalog server to which a mobile computing device connects via a computer network path that traverses a mobile operator network. The method may include receiving data from a mobile device, the data including a locale and a mobile operator identifier stored in memory on the mobile device; searching a database to find a store based on the mobile operator identifier and the locale; if a store is found, populating settings based on the store; and sending configuration information to the mobile device based on the settings.

20 Claims, 3 Drawing Sheets

(56) References Cited

U.S. PATENT DOCUMENTS

| | | | |
|---|---|---|---|
| 2007/0288488 A1* | 12/2007 | Rohrs et al. | 707/100 |
| 2008/0172655 A1* | 7/2008 | Davia | 717/130 |
| 2008/0220772 A1 | 9/2008 | Islam et al. | |
| 2009/0252059 A1 | 10/2009 | Vigue et al. | |
| 2009/0259619 A1* | 10/2009 | Hsieh | 707/2 |
| 2009/0307067 A1* | 12/2009 | Obermeyer | 705/14.1 |
| 2010/0063969 A1* | 3/2010 | Kasargod et al. | 707/740 |
| 2010/0217780 A1* | 8/2010 | Erola et al. | 707/802 |
| 2010/0280918 A1* | 11/2010 | Balent | 705/26 |
| 2011/0086625 A1* | 4/2011 | Inlow et al. | 455/418 |

* cited by examiner

DETECTING MOBILE OPERATOR NETWORKS

BACKGROUND

Digital assets and content, e.g., applications, music, videos, games, etc., may be offered to users of computing devices such as cell phones, PDAs (personal digital assistants), mobile devices, personal computers, etc., by third-party publishers. Mobile operators, which operate the access networks to which mobile computing devices wirelessly connect to enable them to communicate with the Internet, may also in some instances desire to make content available to their user base as third-party publishers. Additionally, manufacturers of operating systems running on the computing devices may provide access to general content for users of the devices, and may operate an online marketplace from which content from the operating system manufacture itself, as well as from the third party publishers, may be downloaded by users.

One drawback of these online marketplaces, however, is that when a vast array of content is made available, it can sometimes be difficult for a user to locate relevant content from a particular third-party publisher of relevance to the user, such as from the user's mobile operator. Due to this difficulty, the user may be unaware of content offers to which the user is entitled. Further, the mobile operators cannot effectively utilize the application catalog to present valuable content to their users.

Detecting mobile operator networks is useful in activating features such as mobile operator billing, and in enabling a mobile operator to offer exclusive content to its users. However, without having in-depth knowledge of specific, encrypted keys, it may be difficult to determine what mobile network a specific mobile device is using to access the Internet, particularly given the many different mobile network providers.

SUMMARY

Various embodiments are disclosed that relate to detecting mobile operator networks. For example, one disclosed embodiment provides a method of operating a catalog server to which a mobile computing device connects via a computer network path that traverses a mobile operator network. The method may include receiving data from a mobile device, the data including a locale and a mobile operator identifier stored in memory on the mobile device; searching a database to find a store based on the mobile operator identifier and the locale; if a store is found, populating settings based on the store; and sending configuration information to the mobile device based on the settings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
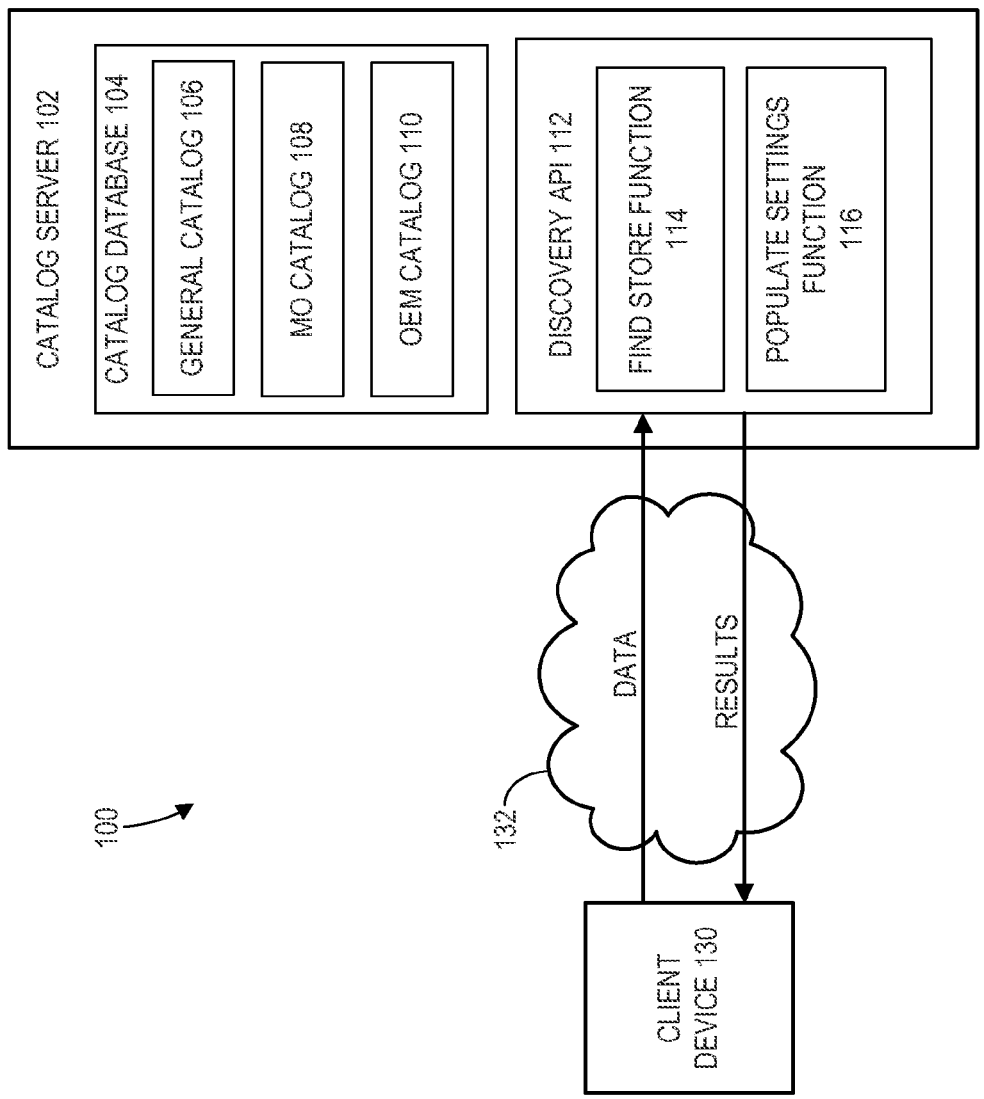
FIG. 1 schematically shows an embodiment of a computing system in accordance with this disclosure.

Turning now to FIG. 1, an embodiment of a computing system 100 in accordance with this disclosure is schematically shown.

Computing system 100 includes a catalog server 102. The catalog server 102 includes a catalog database 104 configured to store digital content such as applications, games, music, videos, and the like, provided by first-party publishers and third-party publishers. For example, a first-party publisher may be a manufacturer or a provider of an operating system running on a client device, such a client device 130, which interfaces with catalog server 102 via network 132. In one embodiment the third-party publishers are mobile operators, which operate mobile networks via which mobile computing devices access network 132. In other embodiments, third-party publishers such as device manufacturers, carrier service providers, wireless service providers, network providers, etc., may also make content available on the catalog server. Network 132 is typically a WAN, and may for example, include the Internet, and is accessed via a client-side access network, such as a mobile operator network.

By way of example, catalog database 104 includes a general catalog 106, a mobile operator (MO) catalog 108, and an OEM catalog 110. The general catalog includes content provided by a first-party publisher. For example, a manufacturer of an operating system running on client device 130 may provide content via catalog server 102 to a user of client device 130. Such first-party publisher provided content is referred to herein as general content which may be stored in the general catalog 106. Further, content in the catalog database 104 may be periodically updated by both first and third-party publishers.

There may be a business desire for a computing device operating system manufacturer to support exclusive content offers by third-party content publishers, such as mobile operators, in addition to first-party or general content. Additionally, a mobile operator may wish to provide incentives for users to be a part of their user base by offering special content and discounts on content.

In order to properly offer third-party exclusive content to users, e.g., a user of client device 130, users may need to be identified as fulfilling various publisher-specific requirements set forth by a third-party publisher of content. Further, it may be desirable to provide a user with a combination of content offered by the general catalog in addition to the content offered by third-party publishers so that a user may browse and possibly purchase or view the content.

The general and third-party content in the catalog database may be displayed to a user of a client device, e.g., client device 130, in a marketplace environment wherein the user may browse available content. However, in order to identify a mobile operator network of a client device 130, catalog server 102 includes a discovery API 112 for identifying which catalogues or stores a user of client device is part of or subscribed to.

The discovery API 112 may include various variables and values used to detect users of client devices who should be offered specific third-party content, e.g., as specified by a third-party publisher. When a client device connects to the marketplace, the client device passes up these values through a configuration step and the client will be returned a list of API endpoints and a list of third-party catalogs they have access to.

The client device 130 is typically a mobile computing device such as a cell phone, tablet computing device, personal data assistant (PDA), laptop computing device, or other mobile personal computer, and interacts with the catalog server 102 via a network 132, as discussed above. Thus, herein in some instances, client device 130 may alternatively be referred to as a mobile device. The client device may be used to access multiple stores or catalogues with content from a plurality of publishers.

Client device 130 may be a mobile device configured to use a variety of different mobile operator network types. For example, the client device may be a GSM or CDMA mobile device with a single SIM and dual SIM memory component. Memory components of the client device may include a variety of data stored thereon and used to identify the device and the mobile operator network.

For example, the mobile device may include a mobile network code (MNC) used in combination with a mobile country code (MCC) (also known as a "MCC/MNC tuple") to uniquely identify a mobile phone operator/carrier. In some examples, the mobile device may include a mobile operator key (MO key) stored thereon which may be used for identification. Additionally, a client device may include an OEM ID stored thereon to identify a manufacturer of the device.

A locale of a client device may be used in addition to the mobile operator identifiers and OEM IDs described above to find mobile operator or OEM specific stores in the catalog database. A client device locale may be determined in a variety of ways. For example, a locale may be cached and stored on catalog server 102 based on an initial configuration or setup step of the client device, e.g., a call to register the device. In other examples, a locale may be stored on a memory component of the client device. For example, upon initially accessing the catalog server, the user may be prompted to enter a country and language pair so that future interactions with the server may be tailored to the user's geographic setting. Such a country and language pair, or in some cases country alone, may be stored as locale data on the catalog server, and in some instances may also be downloaded to the mobile client device. Further, the mobile client device may include software configured to query such locale data from the user, and forward it to the catalog server.

In order to find stores in catalog database 104 based on data received from the client device and a locale of the client device, discovery API includes a find store function 114 configured to search the catalog database to find a store based on a mobile operator identifier and/or OEM ID and a locale of client device 130. The discovery API further includes a populate settings function 116 for populating settings based on a store, if found by the find store function 116.

Figure 2:
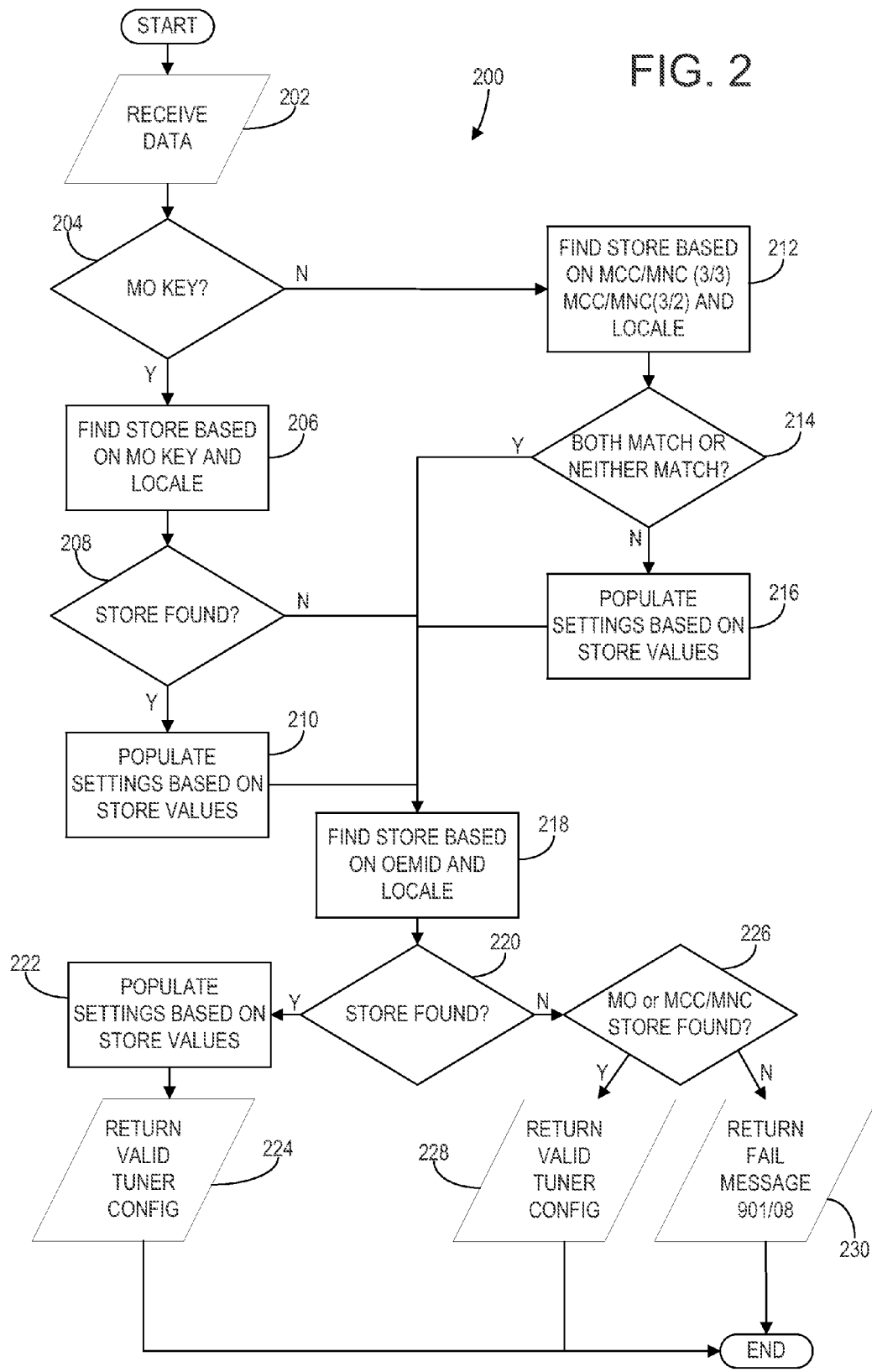
FIG. 2 shows an embodiment of a method for detecting mobile operator networks.

Turning now to FIG. 2, an embodiment of a method 200 for detecting mobile operator networks on a computing device, e.g., catalog server 102, is shown.

At 202, method 200 includes receiving data from a mobile device, where the data includes a locale and a mobile operator identifier stored in a memory component on the mobile device. Locale data, it will be appreciated, may include a geographic identifier such as country code (e.g., JP for Japan), and/or a language identifier (e.g., Japanese).

At 204, method 200 includes determining whether the mobile operator identifier is a mobile operator (MO) key. If the mobile operator identifier is an MO key, then method 200 proceeds to step 206.

At 206, method 200 includes finding a store based on the MO key and locale. For example, a database may be searched to find a store based on the MO key and the locale.

At 208, method 200 includes determining if a store was found based on the MO key. If an MO store is not found at 208, then method 200 proceeds to step 218 described below. However, if a store was found at 208, then method 200 proceeds to step 210.

At 210, method 200 includes populating settings based on the store. Populating settings based on a found store may include populating an xml-template file with store-specific configuration information which may be sent to the mobile device. Following population of store specific settings at 210, method 200 proceeds to step 218 described below.

Returning to step 204, if the data does not include an MO key at 204, then method 200 proceeds to step 212. At 212, method 200 includes finding a store based on a mobile country code/mobile network code tuple and the locale. For example, a database may be searched to find a store based on the mobile country code/mobile network code tuples.

In some examples mobile country code/mobile network code tuples may not be the same on every mobile device; that is, mobile country code/mobile network code tuples may not be unique. Thus, logic may be implemented to assist in finding a store based on a mobile country code/mobile network code tuple. For example, MCC and MNC values each may include three characters used for identification so that a mobile country code/mobile network code tuple may be of the form 3/3. However, in some examples, the last character of a mobile country code/mobile network code tuple may not be used in the identification of a mobile network. Thus, in some examples, the last character of a mobile country code/mobile network code tuple may be removed to form a modified mobile country code/mobile network code tuple of the form 3/2.

Thus, in some examples, if a store is not found based on the mobile country code/mobile network code tuple, the last character of the mobile country code/mobile network code tuple may be removed to obtain a modified tuple and the database may be searched to find a store based on the modified tuple and the locale.

In other examples, both a mobile country code/mobile network code tuple of the form 3/3 and a modified tuple of the form 3/2 may be used in a search of the database to find a store based on the 3/3 and 3/2 tuples. In this example, if a store is found for both the mobile country code/mobile network code tuple and the modified tuple, a fail message may be sent to the mobile device to disable a marketplace presentation on the mobile device since the identified mobile networks are ambiguous.

Thus, at 214, method 200 includes determining if both tuples match or neither match. If both tuples match at 214, then method 200 proceeds to step 218 described below. However, if one tuple match is found at 214, then method 200 proceeds to step 216.

At 216, method 200 includes populating settings based on the found store values and then proceeding to step 218. At step 218, method 200 includes finding a store based on an OEM ID and locale. For example, a database may be searched to find a store based on the OEM ID and the locale.

At 220, method 200 includes determining if an OEM store is found. If an OEM store is found at 220, then method 200 proceeds to step 222. At 222, method 200 includes populating settings based on the OEM store values.

At 224, method 200 includes returning valid tuner configuration values based on the found store settings, where "tuner" refers to a software program (e.g. browser) on the mobile client device that is configured to access or "tune in" content from a remote server, for example, using the HTTP protocol. For example, store-specific configuration information may be sent to the mobile device based on the store settings. The configuration information may be in the form of an xml template file customized based on the populated store specific settings.

Returning to step 220, if an OEM store is not found at 220, then method 200 proceeds to step 226. At 226, method 200 includes determining whether an MO key or MCC/MNC store was found, e.g., in one of the previous steps at 208 and 214. If an MO key or MCC/MNC store was found at 226, then method 200 proceeds to step 228.

At 228, method 200 includes returning valid tuner configuration values based on the found store settings. For example, store-specific configuration information may be sent to the mobile device based on the store settings.

Figure 3:
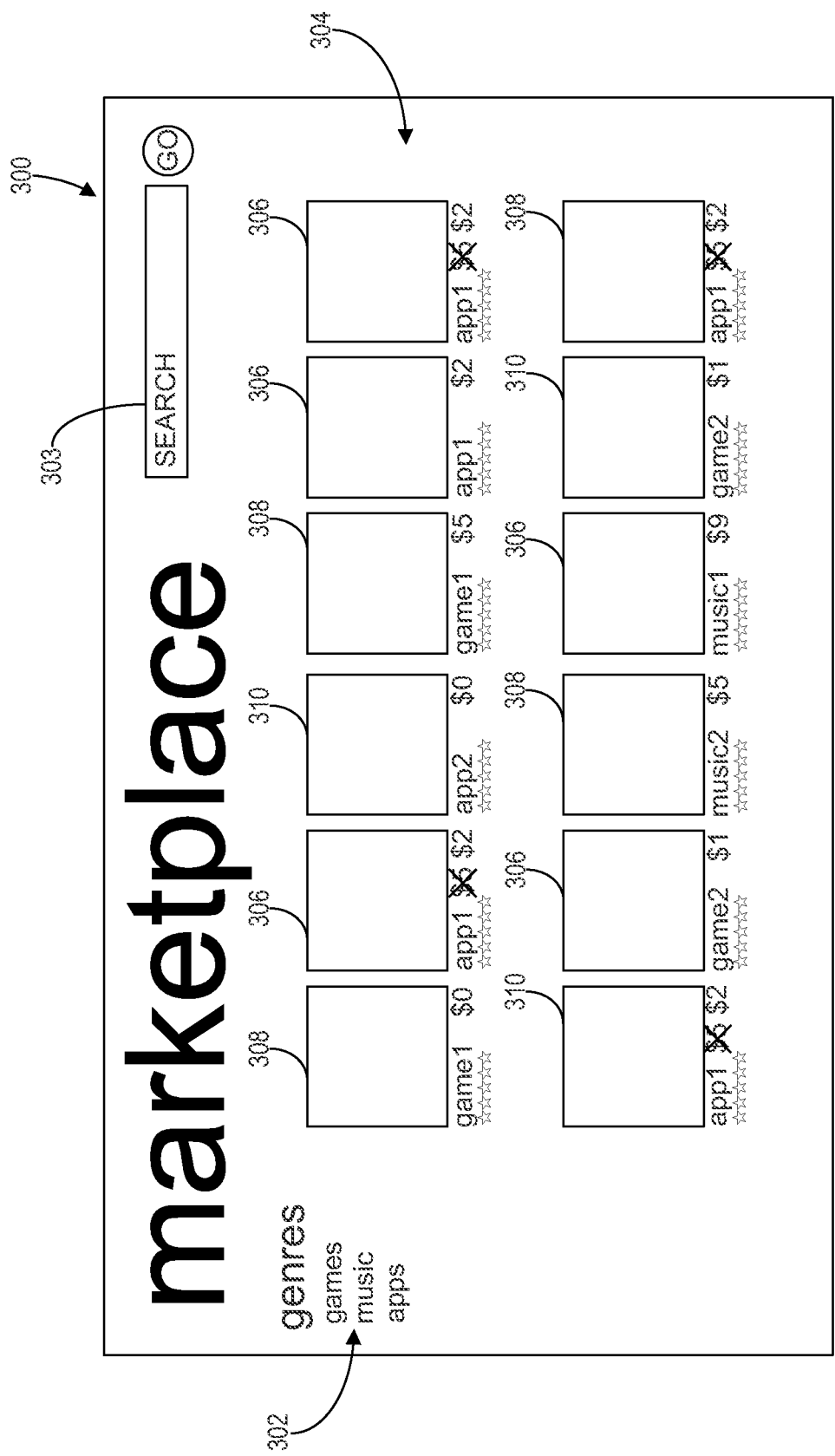
FIG. 3 shows an example embodiment of a graphical user interface on a client device of the system of FIG. 1.

However, if at 226, no store was found, then method 200 proceeds to step 230. At 230, method 200 includes returning or sending a fail message, e.g., a 901/08 message, to the mobile device, e.g., to disable a marketplace presented to a user of the mobile device. In some examples, fail messages may be stored on a log on catalog server 102 in order to add data and improve future detection effectiveness FIG. 3 shows an example embodiment of a graphical user interface 300 on a client device in accordance with this disclosure. GUI 300 may be an example GUI for an online marketplace served by the catalog server of FIG. 1, and may present a hybrid view of content 304 from a plurality of different catalogues and may include various customizations provided by publishers of the content.

For example, GUI 300 may present a hybrid view of content from a general catalog 306, content from an MO catalog 308, and content from an OEM catalog 310. The marketplace may additionally include various browsing functions such as directories 302 and a search box 303.

Each computing device disclosed herein includes a physical processor and an associated memory and mass storage device. The processor is configured to execute software stored on the mass storage device using portions of memory to implement the functions described above. In some embodiments, the processor and memory may be integrated on a single chip. Each computing device may optionally include a user input device, such as a keyboard, touchpad, touch screen, or mouse, and a display. Each computing device may further include a network communication system configured to enable the device to communicate with other devices over wired and/or wireless networks, including the Internet. The computing device may further include computer readable media storing instructions that when executed by the processor cause the computing device to perform the functions recited above It is to be understood that virtually any computer architecture may be used without departing from the scope of this disclosure. In different embodiments, computing system 100 may take the form of a mainframe computer, server computer, desktop computer, laptop computer, tablet computer, home entertainment computer, network computing device, mobile computing device, mobile communication device, gaming device, etc. The methods and processes described below herein may be implemented as a computer application, computer service, computer API, computer library, and/or other computer program products It is to be appreciated that a data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of a computing device that is implemented to perform one or more particular functions. In some cases, such a module, program, or engine may be instantiated via a processor executing instructions held by memory or mass storage. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating a content marketplace server, the method comprising:
   receiving data from a mobile device, the data including a locale and a mobile operator identifier stored in memory on the mobile device;
   searching a catalog database to find a mobile operator catalog based on the mobile operator identifier and the locale, where the catalog includes a general catalog;
   providing a discovery application program interface (API) in the content marketplace server to identify a mobile operator network of a mobile device and identify which stores a user of the device is subscribed to, including variables and/or values used to detect users who should be offered third party content;
   in response to finding the mobile operator catalog, utilizing the discovery API to populate store specific settings based on the found mobile operator catalog and the general catalog;
   sending configuration information to the mobile device based on the store specific settings;
   if the mobile operator catalog is found, connecting the mobile device with a browsable online marketplace through the discovery API to access digital content of relevance to the user; and
   sending to the mobile device data to cause the mobile device to display a browsable online marketplace of digital content for the mobile device, the browsable online marketplace of digital content corresponding to the found mobile operator catalog and the general catalog.

2. The method of claim 1, wherein the mobile operator identifier is a mobile country code/mobile network code tuple.

3. The method of claim 2, further comprising:
if a mobile operator catalog is not found based on the mobile country code/mobile network code tuple, removing a last character of the tuple to obtain a modified tuple;
searching the catalog database to find a mobile operator catalog based on the modified tuple and the locale;
in response to finding the mobile operator catalog, populating the store specific settings based on the mobile operator catalog and the general catalog; and
sending configuration information to the mobile device based on the store specific settings.

4. The method of claim 2, further comprising:
removing the last character of the mobile country code/mobile network code tuple to obtain a modified tuple;
searching the catalog database to find a mobile operator catalog based on the modified tuple and the locale; and
if a mobile operator catalog is found for both the mobile country code/mobile network code tuple and the modified tuple, sending a fail message to the mobile device.

5. The method of claim 1, further comprising sending a fail message to the mobile device if the mobile operator catalog is not found.

6. The method of claim 1, wherein the mobile operator identifier is a mobile operator key.

7. The method of claim 1, wherein the data includes a manufacturer ID and the method further comprises:
searching the catalog database to find an original equipment manufacturer catalog based on the manufacturer ID and the locale;
if the original equipment manufacturer catalog is found, populating settings based on the original equipment manufacturer catalog; and
sending configuration information to the mobile device based on the settings.

8. The method of claim 1, wherein the configuration information is an xml file with catalog specific information.

9. A method for operating a content marketplace server, the method comprising:
receiving data from a mobile device, the data including a locale and a mobile operator identifier stored in memory on the mobile device, where the mobile operator identifier is either a mobile country code/mobile network code tuple or a mobile operator key;
searching a catalog database to find a mobile operator catalog including content provided by a third-party publisher based on the mobile operator identifier and the locale, where the catalog database includes a general catalog including content provided by a first-party publisher;
providing a discovery application program interface (API) in the content marketplace server to identify a mobile operator network of a mobile device and identify which stores a user of the device is subscribed to, including variables and/or values used to detect users who should be offered third party content;
in response to finding the mobile operator catalog:
utilizing the discovery API to populate store specific settings based on the mobile operator catalog and the general catalog;
sending configuration information to the mobile device based on the store specific settings;
if the mobile operator catalog is found, connecting the mobile device with a browsable online marketplace through the discovery API to access digital content of relevance to the user; and
sending to the mobile device data to cause the mobile device to display a browsable online marketplace of digital content for the mobile device, the browsable online marketplace of digital content corresponding to the found mobile operator catalog and the general catalog; and
if the mobile operator catalog is not found, sending a fail message to the mobile device.

10. The method of claim 9, further comprising:
if a mobile operator catalog is not found based on the mobile country code/mobile network code tuple, removing a last character of the mobile country code/mobile network code tuple to obtain a modified tuple;
searching the catalog database to find the mobile operator catalog based on the modified tuple and the locale;
in response to finding the mobile operator catalog, populating the store specific settings based on the mobile operator catalog and the general catalog; and
sending configuration information to the mobile device based on the store specific settings.

11. The method of claim 9, further comprising:
removing the last character of the mobile country code/mobile network code tuple to obtain the modified tuple;
searching the catalog database to find the mobile operator catalog based on the modified tuple and the locale; and
if a mobile operator catalog is found for both the mobile country code/mobile network code tuple and the modified tuple, sending a fail message to the mobile device.

12. The method of claim 9, wherein the data includes a manufacturer ID and the method further comprises:
searching the catalog database to find an original equipment manufacturer catalog based on the manufacturer ID and the locale;
if the original equipment manufacturer catalog is found, populating settings based on the original equipment manufacturer catalog; and
sending configuration information to the mobile device based on the settings.

13. The method of claim 9, wherein the configuration information is an xml file with catalog specific information.

14. The method of claim 9, wherein the fail message is configured to cause a marketplace on the mobile device to be disabled upon receipt by the mobile device.

15. A content marketplace server, comprising:
a logic subsystem; and
a data holding subsystem comprising machine-readable instructions stored thereon that are executable by the logic subsystem to:
receive data from a mobile device, the data including a locale and a mobile operator identifier stored in memory on the mobile device;
search a catalog database to find a mobile operator catalog based on the mobile operator identifier and the locale, where the catalog database includes a general catalog;
provide a discovery application programming interface (API) in the content marketplace server to identify a mobile operator network of a mobile device and identify which stores a user of the device is subscribed to, including variables and/or values used to detect users who should be offered third party content;
in response to finding the mobile operator catalog, utilize the discovery API to populate store specific settings based on the mobile operator catalog and the general catalog;

send configuration information to the mobile device based on the store specific settings;

if the mobile operator catalog is found, connect the mobile device with a browsable online marketplace through the discovery API to access digital content of relevance to the user; and display on the mobile device a browsable online marketplace of digital content for the mobile device, the browsable online marketplace of digital content corresponding to the found mobile operator catalog and the general catalog.

16. The content marketplace server of claim 15, wherein the mobile operator identifier is a mobile country code/mobile network code tuple.

17. The content marketplace server of claim 15, wherein the data holding subsystem comprises machine-readable instructions stored thereon that are further executable by the logic subsystem to:

if the mobile operator catalog is not found based on the mobile country code/mobile network code tuple, remove a last character of the mobile country code/mobile network code tuple to obtain a modified tuple;

search the catalog database to find the mobile operator catalog based on the modified tuple and the locale;

in response to finding the mobile operator catalog, populate store specific settings based on the mobile operator catalog and the general catalog; and send configuration information to the mobile device based on the store specific settings.

18. The content marketplace server of claim 15, wherein the data holding subsystem comprises machine-readable instructions stored thereon that are further executable by the logic subsystem to:

remove a last character of a mobile country code/mobile network code tuple to obtain a modified tuple;

search the catalog database to find the mobile operator catalog based on the modified tuple and the locale; and if a mobile operator catalog is found for both the mobile country code/mobile network code tuple and the modified tuple, send a fail message to the mobile device.

19. The content marketplace server of claim 15, wherein the mobile operator identifier is a mobile operator key.

20. The content marketplace server of claim 15, wherein the data includes a manufacturer ID and the data holding subsystem comprises machine-readable instructions stored thereon that are further executable by the logic subsystem to:

search the catalog database to find an original equipment manufacturer catalog based on the manufacturer ID and the locale;

if the original equipment manufacturer catalog is found, populate settings based on the original equipment manufacturer catalog; and send configuration information to the mobile device based on the settings.

* * * * *